United States Patent [19]

Miura

[11] 4,224,680
[45] Sep. 23, 1980

[54] PARITY PREDICTION CIRCUIT FOR ADDER/COUNTER

[75] Inventor: Kenichi Miura, Saratoga, Calif.

[73] Assignee: Fujitsu Limited, Kawasaki, Japan

[21] Appl. No.: 912,452

[22] Filed: Jun. 5, 1978

[51] Int. Cl.² ............................................. G06F 11/10
[52] U.S. Cl. .................................................... 364/738
[58] Field of Search ........................................ 364/738

[56] References Cited

U.S. PATENT DOCUMENTS

| | | | |
|---|---|---|---|
| 3,141,962 | 7/1964 | Sakalay | 364/738 |
| 3,287,546 | 11/1966 | Geller | 364/738 |
| 3,732,407 | 5/1973 | Brewster et al. | 364/738 |

OTHER PUBLICATIONS

Kuckein, "High-Speed Parity Predictor for Adder", IBM Tech. Disclosure Bulletin, vol. 17, No. 2, Jul. 1974, pp. 540-542.

Primary Examiner—David H. Malzahn
Attorney, Agent, or Firm—David E. Lovejoy

[57] ABSTRACT

A parity prediction circuit for predicting parity in an adder, counter or similar device. The parity prediction is obtained with a parity prediction network connected from most significant bit to least significant bit. The parity prediction network is used in place of a parity generator or in combination with a parity generator for error checking purposes. In a special application, the parity prediction is employed for a ripple-carry type counter where the predicted parity bit is produced by a single network of NAND gates connected in series from high-order to low-order counter bits. The predicted parity is available no later than the completion of the carry-out propagation.

20 Claims, 5 Drawing Figures

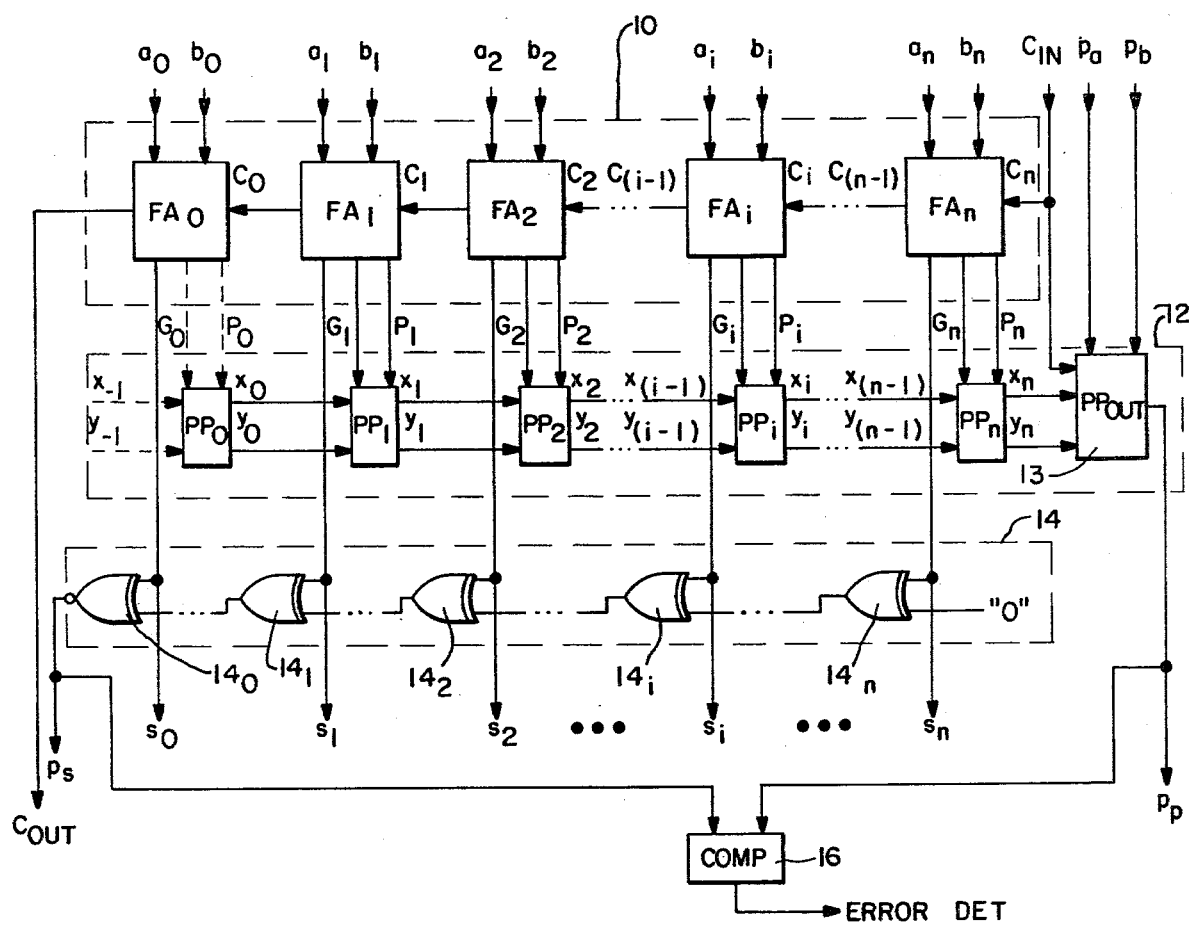
FIG.—1
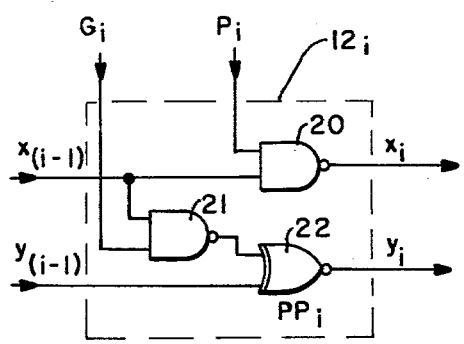
FIG.—2
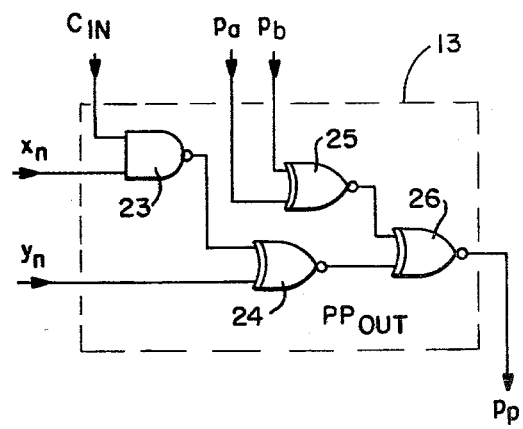
FIG.—3

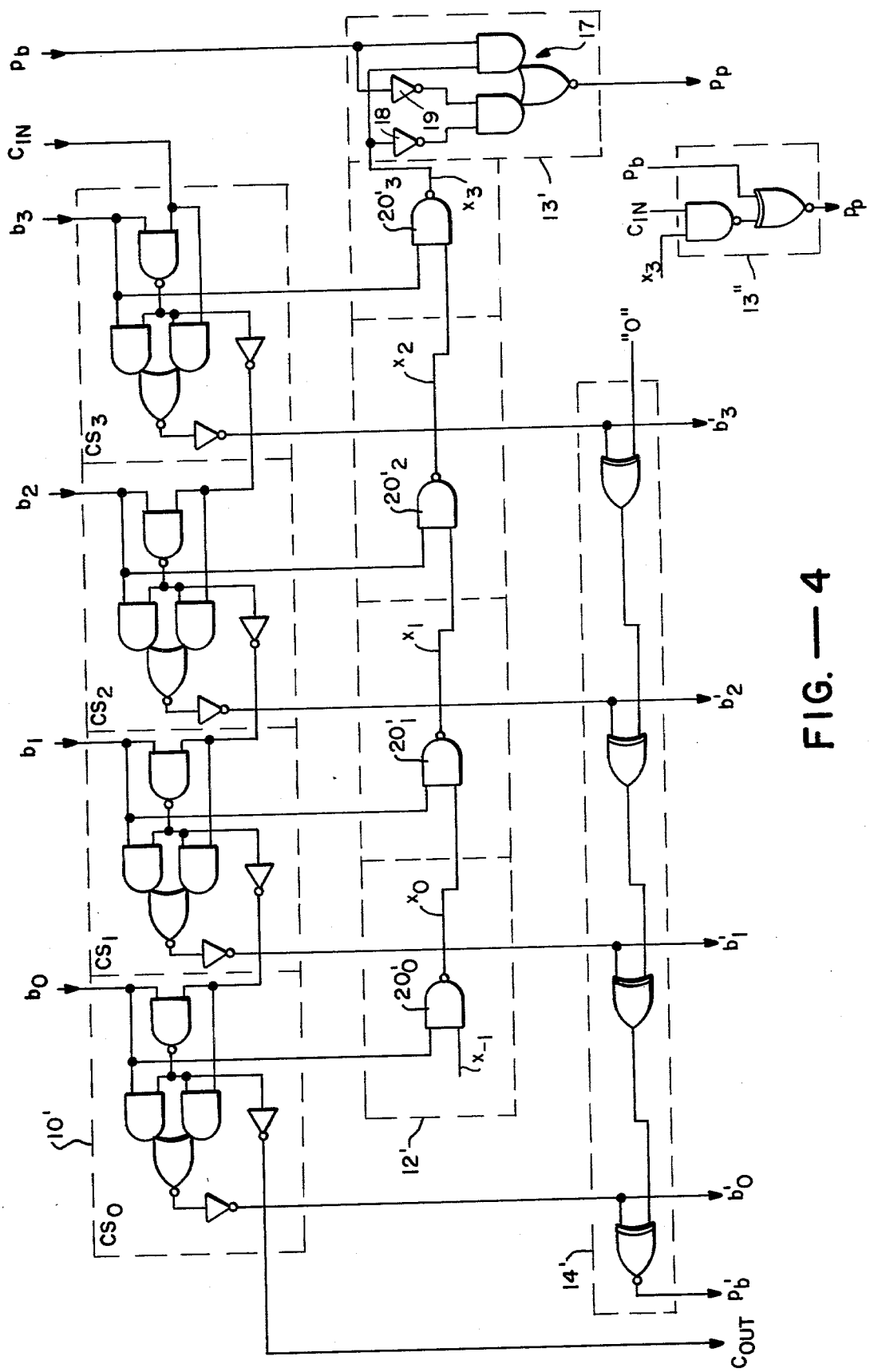
FIG.—4

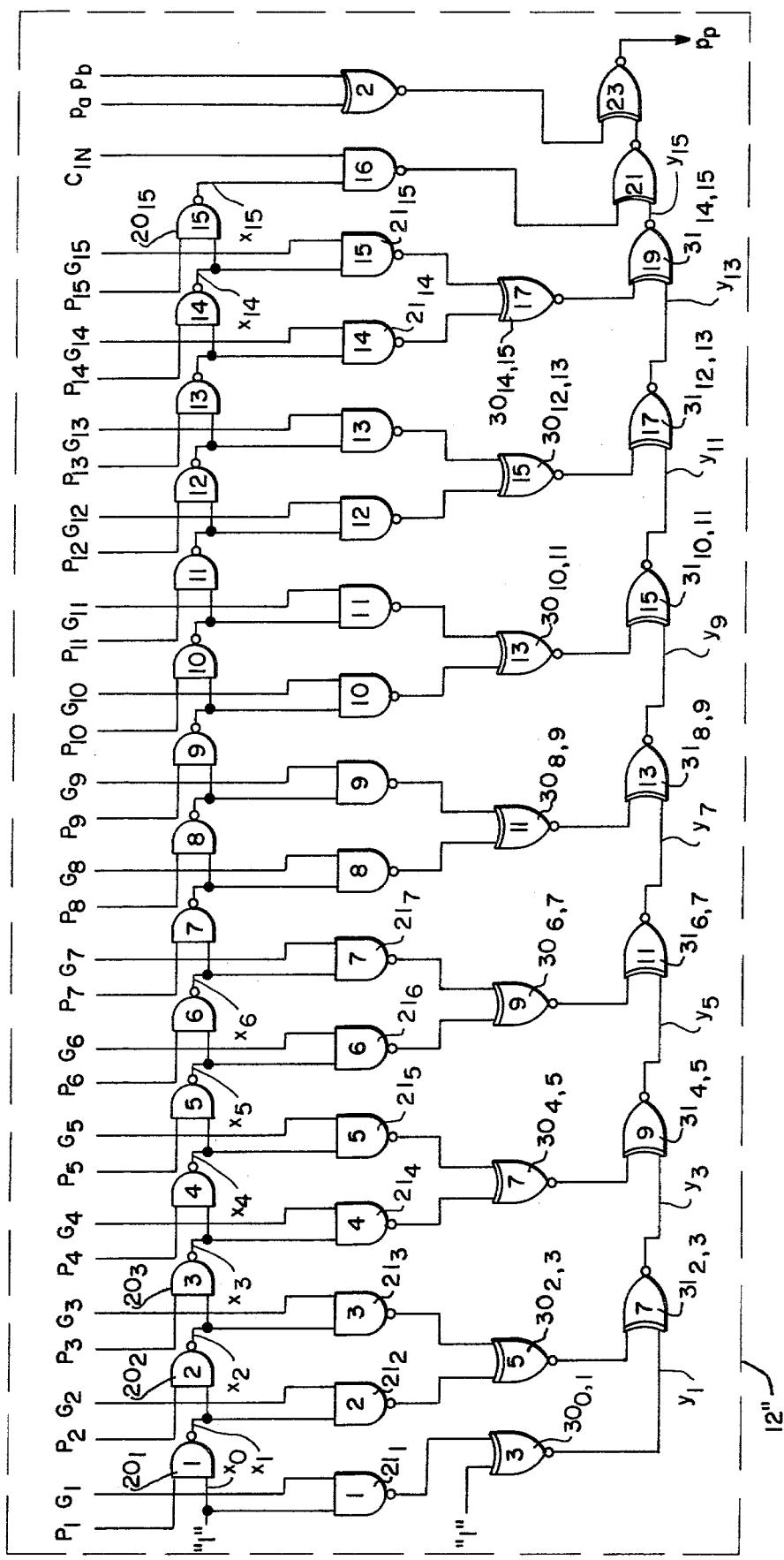
FIG.—5

PARITY PREDICTION CIRCUIT FOR ADDER/COUNTER

BACKGROUND OF THE INVENTION

The present invention relates to parity prediction circuits and particularly to parity prediction circuits for use in adders, counters and other similar data processing circuits. Parity predition and parity generation have long been employed in data processing circuits for the detection of errors.

Parity generation is a term which describes the generation of a parity bit, $p_a$, from a binary number having the n+1 bits $a_0, a_1, \ldots, a_n$. Where "$\oplus$" is an EXCLUSIVE-OR symbol and "$\overline{\oplus}$" is an EXCLUSIVE-NOR symbol, the generated parity bit, $p_a$, is defined as follows:

$$p_a = a_0 \oplus a_1 \ldots \oplus a_{n-1} \overline{\oplus} a_n$$

A binary adder functions to add a first binary number $a_0, a_1, \ldots, a_n$ and a second binary number $b_0, b_1, \ldots, b_n$ to form the sum $s_0, s_1, \ldots, s_n$. Parity generation from the sum forms the parity bit, $p_s$, given as follows:

$$p_s = s_0 \oplus s_1 \ldots \oplus s_{n-1} \overline{\oplus} s_n$$

It is well-known that the parity bit, $p_s$, generated from the sum, that is, generated from the adder output only, does not indicate whether or not the summation was performed correctly by the adder.

Parity prediction is a term which describes the technique of forming a parity bit, $p_p$, based upon the inputs to an adder or other device rather than based solely upon the output of the device. If the predicted parity bit, $p_p$, is independently derived from the inputs, the predicted parity bit, $p_p$, can be compared with the generated parity bit, $p_s$, for error-detecting purposes. For example, in a binary adder, the comparison of the predicted parity bit, $p_p$, with the generated parity bit, $p_s$, can be used to detect errors in the addition performed by the adder. If the predicted and generated parity bits are the same, no error is detected. If the predicted and generated parity bits differ, then an error is detected.

For the purpose of error detecting, the parity prediction bit should be as independent as possible from any parity generation bit generated directly from the device output without, however, introducing too much circuit complexity. To the extent that the parity prediction bit is not independent from the parity generation bit, the predicted parity and the generated parity may both be wrong so that no error detection can occur.

Predicted parity is useful also as a replacement for generated parity particularly when the predicted parity is simpler, faster operating, or otherwise superior.

While a number of parity prediction circuits and techniques have been known, there is a need for improved parity prediction circuits. Particularly, there is a need for parity prediction circuits which are suitable for use in connection with large scale integration such as metal oxide silicon (MOS) technology.

In accordance with the above background, it is an object of the present invention to provide an improved parity prediction circuit for adders and counters.

SUMMARY OF THE INVENTION

The present invention is a parity prediction circuit in conjunction with adders, counters and other similar devices for predicting the parity of the outputs from the devices. The parity prediction circuit includes a network for transmitting one or more parity prediction transmission bits from the most significant (high-order) bit to the least significant (low-order) bit of the adder or other device. The transmitted parity prediction information is logically combined with the carry-in and the parity bits of each of the input numbers to the adder or other device to form the predicted parity of the device output.

In a particular example, for a binary adder of n+1 bits, the parity prediction network includes n stages where the $i^{th}$ stage transmits the parity prediction information as the two bits $x_i$ and $y_i$. The $x_i$ and $y_i$ parity prediction bits are transmitted to the $i+1^{th}$ stage.

The transmitted parity prediction bits $x_i$ and $y_i$ are defined in terms of the transmitted information from the next high-order previous $i-1^{th}$ stage and the bit propagate, $P_i$, and bit generate, $G_i$, where $P_i$ and $G_i$ are formed from the $i^{th}$ bits of the binary input numbers $a_0, a_1, \ldots, a_i, \ldots, a_n$, and $b_0, b_1, \ldots, b_i, \ldots, b_n$. The $x_i$ and $y_i$ bits are given as follows:

$x_i = \overline{[P_i][x_{i-1}]}$
$y_i = [y_{i-1}] \overline{\oplus} \overline{[(G_i)(x_{i-1})]}$ where:
$x_{i-1}$ = first transmitted bit from $i-1^{th}$ stage
$y_{i-1}$ = second transmitted bit from $i-1^{th}$ stage
$P_i = a_i \oplus b_i$ = EXCLUSIVE-OR of $a_i$ and $b_i$
$G_i = (a_i)(b_i)$ = AND of $a_i$ and $b_i$
$\oplus$ = EXCLUSIVE-OR symbol
$\overline{\oplus}$ = EXCLUSIVE-NOR symbol In a particular embodiment of the adder in which the binary input number $a_0, a_1, \ldots, a_n$ is 0 for all (n+1) bits, the two number binary adder reduces to a binary counter. In such a binary counter where all values of $a_i$ (for "i" equal to $0, 1, \ldots, n$) equal to 0, the $G_i$ term also becomes equal to 0 and the $P_i$ term reduces to $b_i$. With these simplifications, each stage of the parity prediction network becomes a simple NAND gate or other simple logical structure. Such a network of NAND gates is substantially more simple than the network of EXCLUSIVE-OR and EXCLUSIVE-NOR gates which can be employed to generate parity in a conventional manner. Also, the parity prediction from the NAND gate network of the present invention is available not later than a carry-out from the high-order stage of the counter.

In another embodiment of the invention, EXCLUSIVE-NOR gates used in forming the parity prediction stages for a full binary adder are bundled in pairs. With this bundling, the gate delay of the parity prediction network is substantially reduced.

In accordance with the above summary, the present invention achieves the objective of providing improved parity prediction circuits in conjunction with binary adders, counters and similar devices.

Additional objects and features of the present invention will appear from the following description in which the preferred embodiments of the invention have been set forth in detail in conjunction with the drawings.

BRIEF DESCRIPTION OF THE DRAWINGS

FIG. 1 is a schematic block diagram of a two number binary full adder having parity generation and parity prediction in accordance with the present invention.

FIG. 2 depicts a schematic electrical diagram of one stage of the parity prediction network of the FIG. 1 apparatus.

FIG. 3 depicts an electrical schematic diagram of the parity prediction output stage of the parity prediction network of the FIG. 1 embodiment.

FIG. 4 depicts a schematic electrical diagram of a 4-bit counter with a parity prediction network in accordance with the present invention.

FIG. 5 depicts a 16-bit parity prediction network in which EXCLUSIVE-NOR gates are bundled in pairs in accordance with one embodiment of the present invention for use with a 16-bit binary adder of the FIG. 1 type.

DETAILED DESCRIPTION

In FIG. 1, a full adder 10 is shown schematically. The full adder 10 adds a first binary number $a_0, a_1, \ldots, a_i, \ldots, a_n$ and a second binary number $b_0, b_1, \ldots, b_i, \ldots, b_n$ to form the full sum $s_0, s_1, \ldots, s_i, \ldots, s_n$. The full adder 10 includes the stages $FA_0, FA_1, FA_2, \ldots, FA_i, \ldots, FA_n$.

In FIG. 1, each of the stages $FA_1$ (for "i" equal to 0, 1, ..., n) receives a carry-in $C_i$ and produces a carry-out $C_{i-1}$. The carry-in, $C_n$, for the stage $FA_n$ is a carry-in signal, $C_{IN}$. The carry-out from the high-order stage $FA_0$ is the carry-out signal $C_{OUT}$.

In FIG. 1, the parity of the binary number $a_0, a_1, \ldots, a_n$ is given by the parity bit $p_a$. Similarly, the parity of the binary number $b_0, b_1, \ldots, b_n$ is given by the parity bit $p_b$. The parity bits $p_a$ and $p_b$ can be formed in any manner. For example, conventional ripple-type parity generation employs a string of EXCLUSIVE-OR gates similar to or like that shown for network 14 in connection with the sum output from the adder. Also, conventional tree-type parity generation circuits are well-known and may be employed.

In a conventional manner, the parity generation network 14 includes the EXCLUSIVE-NOR gate $14_0$ and the EXCLUSIVE-OR gates $14_1, 14_2, \ldots, 14_i, \ldots, 14_n$. The gate $14_n$ is trivial in that it receives the $s_n$ input and a constant logical "0" input. Because the parity bit, $p_s$, generated by network 14 is derived directly from the sum output $s_0, s_1, \ldots, s_n$, the generated parity bit $p_s$ cannot detect any error in the addition by the full adder 10.

In accordance with the present invention in FIG. 1, a parity prediction network 12 is provided. The parity prediction network 12 includes the parity prediction stages $PP_0, PP_1, PP_2, \ldots, PP_i, \ldots, PP_n$ and the parity prediction $PP_{OUT}$ output stage 13. The stage $PP_i$ is typical of each of the stages for i equal to 1, 2, ..., n. In the embodiment shown, the stage $PP_0$ is trivial and only generates constant logical 1's. If the value of the carry-out $C_{OUT}$ is to be considered together with the sum in forming the predicted parity, then the stage $PP_0$ is not trivial and is like each of the other stages $PP_i$. In such case, the $PP_0$ stage has inputs, $x_{-1}$ and $y_{-1}$, both equal to a constant 1 and has outputs, $x_0$ and $y_0$, determined in the same manner as the other $x_i$ and $y_i$ outputs for values of "i" greater than 0.

The $PP_i$ parity prediction stage receives the two transmitted parity information bits $x_{i-1}$ and $y_{i-1}$ as inputs from the previous $i-1^{th}$ stage and receives the bit propagate $P_i$ and the bit generate $G_i$ bits as inputs from the full adder $FA_i$ stage. In response to these inputs the $PP_i$ parity prediction stage transmits the two parity prediction information bits $x_i$ and $y_i$ to the next $i+1^{th}$ stage. In the case of the $PP_1$ stage, $x_0$ and $y_0$ are each logical 1's. In the case of the low-order $PP_n$ stage, the $x_n$ and $y_n$ low-order transmission bits connect as inputs to the $PP_{OUT}$ circuit 13.

In FIG. 1, the parity prediction $PP_{OUT}$ circuit, in addition to the transmission bits $x_n$ and $y_n$, receives the $C_{IN}$, the $p_a$ and $p_b$ bits as inputs. The $PP_{OUT}$ output stage 13 logically combines those inputs to generate the predicted parity bit $p_p$.

It is apparent from the FIG. 1 circuit that the parity prediction network 14 forms the predicted parity bit independently of the parity generation bit $p_s$. Accordingly, a conventional comparator 16 for comparing the $p_s$ and $p_p$ bits produces an error-detection signal (ERROR DET) whenever those bits are different.

It should also be noted that in FIG. 1, the parity prediction network 12 transmits the two parity prediction bits from stage to stage from the high-order $PP_1$ stage to the low-order $PP_n$ stage, that is, for all stages of $PP_i$ for values of "i" from 1 to "n".

In FIG. 1, the bit propagate signals, such as $P_i$ for the $i^{th}$ stage, and the bit generate signals, such as $G_i$ for the $i^{th}$ stage, are generated in a conventional manner from the corresponding $i^{th}$ stage $FA_i$ of the full adder. More specifically, the $P_i$ and $G_i$ signals are given as follows:

$$P_i = a_i \oplus b_i$$

$$G_i = (a_i)(b_i)$$

$$i = 1, 2, \ldots, n$$

In FIG. 2, further details of the $PP_i$ stage of the parity prediction network 12 is shown as typical of the "n" stages $PP_1, PP_2, \ldots, PP_n$. The stage $PP_i$ includes the NAND gate 20 which logically combines the $x_{i-1}$ and the $P_i$ signals to provide the $x_i$ signal. The stage $PP_i$ includes the NAND gate 21 which logically combines the $x_{i-1}$ and the $G_i$ signals to provide an input to the EXCLUSIVE-NOR gate 22. Gate 22 receives as its other input the $y_{i-1}$ signal. Gate 22 produces the $y_i$ signal as an output. Accordingly, the $PP_i$ stage of FIG. 2 generates the parity prediction transmission bits $x_i$ and $y_i$ for all values of "i" from 1 to "n" as follows:

$$x_i = \overline{[P_i][x_{i-1}]}$$

$$y_i = [y_{i-1}] \oplus \overline{[(G_i)(x_{i-1})]}$$

where:

$$x_0 = 1$$

$$y_0 = 1$$

In FIG. 3, further details of the $PP_{OUT}$ stage 13 of the parity prediction network 12 of FIG. 1 are shown. The $PP_{OUT}$ stage includes the NAND gate 23 which logically combines the $C_{IN}$ bit and the $x_n$ bit to form an input to the EXCLUSIVE-NOR gate 24. The other input to the gate 24 is the $y_n$ bit. The output from the gate 24 is an input to the EXCLUSIVE-NOR gate 26. The other input to the gate 26 is from the EXCLUSIVE-NOR gate 25. Gate 25 produces its output as a logical combination of the parity input bits $p_a$ and $p_b$. The output from the EXCLUSIVE-NOR gate 26 is the predicted parity bit $p_p$. Any two of the gates 24, 25 or 26 may be changed to EXCLUSIVE-OR gates without changing the intended logical function.

In connection with the generation of the predicted parity bit $p_p$, it should be noted that the prediction network 12 does not utilize any of the carry signals $C_i$ internal to the full adder 10. For this reason, the predicted parity $p_p$ output is available at least as soon as the carryout, $C_{OUT}$ from the high-order stage $FA_0$. The high-speed nature of the parity prediction network 12 coupled with its independence from the generated parity $p_s$, renders the predicted parity $p_p$ ideal for comparison with generated parity $p_s$ for detecting errors in the addition performed by the full adder 10.

In FIG. 4, a 4-bit counter with a parity prediction circuit is provided as a special case of the FIG. 1 circuit where "n" is equal to 3. In FIG. 4, the counter stages $CS_0$, $CS_1$, $CS_2$ and $CS_3$ correspond to the full adder stages $FA_0$, $FA_1$, ..., $FA_n$ in FIG. 1 where "n" is equal to 3. In the FIG. 1 circuitry, it is assumed that all values of $a_i$ for "i" equal to 0, 1, ..., n are equal to 0. With this assumption, the full adder stages of FIG. 1 can be reduced to counter stages of the type shown in FIG. 4.

In FIG. 1 with all the values of $a_i$ equal to 0, the bit propagate $P_i$ and bit generate $G_i$ values also are reduced. The values of $G_i$ for all values of "i" equal to 0, 1, 2, ..., n are 0. All values of $P_i$ or "i" equal to 0, 1, 2, ..., n become equal respectively to $b_i$.

Under these conditions, each parity prediction stage $12_i$ of the FIG. 2 type is reduced to the NAND gate 20. The parity prediction network therefore becomes a string of 2-input NAND gates $20'_0$, $20'_1$, $20'_2$ and $20'_3$ as shown in FIG. 4. The NAND gate $20'_0$ is employed (with the $x_{-1}$ input equal to 1) only when the counter carry-out $C_{OUT}$ is to be considered in forming the predicted parity. When the predicted parity does not consider $C_{OUT}$ (that it, predicts parity for only $b'_0$, $b'_1$, $b'_2$ and $b'_3$) then gate $20'_0$ can be eliminated. Alternatively, if gate $20'_0$ is retained, its input $x_{-1}$ is equal to 0 so that $x_0$ is always equal to 1. The $x_{-1}$ input, therefore, is a control for selecting or excluding the carry-out $C_{OUT}$ from the parity prediction.

In FIG. 4, the $PP_{OUT}$ circuit 13' includes an AND-OR-INVERT gate 17 forming the predicted parity $p_p$. The gate 17 receives the low-order transmission bit $x_3$ ($x_n$ with "n" equal to 3) from the low-order stage consisting of NAND gate $20'_3$. The $x_3$ bit connects to gate 17 directly on one side and through INVERTER gate 18 on the other side. Similarly, the parity $p_b$ connects directly on one side to gate 17 and through inverter 19 on the other side. The circuit 13' effectively forms the EXCLUSIVE-OR of the $x_3$ and $p_b$ signals. With this embodiment, $p_p$ is always the predicted parity for the binary number $b_0$, $b_1$, $b_2$ and $b_3$ as stepped by a $+1$ increment by the stepping signal $C_{IN}$. In the case where $C_{IN}$ is a selectable 1 or 0, the $p_p$ value is valid after the $C_{IN}$ signal steps $b_0$, $b_1$, $b_2$ and $b_3$ by $+1$ to form the new binary number $b'_0$, $b'_1$, $b'_2$ and $b'_3$. Note that circuit 13' does not require any connection to the $C_{IN}$ stepping input. In the case where $C_{IN}$ is always a constant 1, then the counter output is always the new binary number having the predicted parity $p_p$.

In FIG. 4, the circuit 13" is an alternate embodiment for circuit 13'. Circuit 13" receives the $C_{IN}$ stepping signal and logically combines it with the low-order transmission bit $x_3$ and the parity $p_b$ to form the predicted parity $p_p$. For circuit 13", $p_p$ is always valid for $b'_0$, $b'_1$, $b'_2$ and $b'_3$.

In FIG. 4, the parity prediction network 12' is even more simple than the parity generation network 14'. The simplicity of the parity prediction network comprising NAND gates is more simple than the parity generation network comprising a string of EXCLUSIVE-OR and EXCLUSIVE-NOR gates since NAND gates are simpler to construct in integrated semiconductor technology than EXCLUSIVE-OR and EXCLUSIVE-NOR gates. Normally, the delay time of a 2-input EXCLUSIVE-NOR gate is twice the delay time of a 2-input NAND gate. Accordingly, the formation of the predicted parity bit $p_p$ is substantially faster for the counter of FIG. 4 then the generation of the generated parity bit $p_{b'}$.

In FIG. 5, an alternate prediction network 12" for use in connection with a 16-bit example of the full adder of FIG. 1 is shown. In FIG. 5, the bit propagate signals $P_i$ and the bit generate signals $G_i$ for "i" equal to 1, 2, ..., 15 are the same as defined in connection with FIG. 1. Similarly, the NAND gates $20_1$, $20_2$, ..., $20_{15}$ are analogous to the NAND gate 20 in FIG. 2. In FIG. 5, the NAND gates $21_1$, $21_2$, ..., $21_{15}$ are analogous to the NAND gate 21 of FIG. 2. The gates $21_1$, $21_2$, ..., $21_{15}$ form the parity prediction transmission bits $x_1$, $x_2$, ..., $x_{15}$, respectively. In FIG. 5, no direct analogy is present for the EXCLUSIVE-NOR gate 22 of FIG. 2. Rather, pairs of NAND gates 21 provide inputs to the bundled EXCLUSIVE-NOR gates 30. For example, the outputs from NAND gates $21_2$ and $21_3$ connect as inputs to the EXCLUSIVE-NOR gate $30_{2,3}$. The output from the gate $30_{2,3}$ provides an input to the EXCLUSIVE-NOR gate $31_{2,3}$. The output from the gate $31_{2,3}$ provides one input to the EXCLUSIVE-NOR gate $31_{4,5}$ along with the output from the EXCLUSIVE-NOR gate $30_{4,5}$.

In FIG. 5, the EXCLUSIVE-NOR gate $31_{2,3}$ takes the place of two or the gates of the gate 22 type in FIG. 2. Gate $31_{2,3}$ receives the $y_1$ input and produces the $y_3$ output. Similarly, the gate $31_{4,5}$ receives the $y_3$ input and produces the $y_5$ output. The even-valued $y_2$ and $y_4$ signals are not explicitly formed although their values, of course, are included within the odd-valued $y_3$ and $y_5$. More generally, the EXCLUSIVE-NOR gates $31_{2,3}$; $31_{4,5}$; $31_{6,7}$; ...; $31_{14,15}$ produce the odd-valued signals $y_3$, $y_5$, $y_7$, ..., $y_{15}$, respectively. Although the even-valued signals $y_2$, $y_4$, $y_6$, ..., $y_{14}$ are not explicitly generated they are included within the values $y_3$, $y_5$, $y_7$, ..., $y_{15}$, respectively.

In FIG. 5, the parity prediction network 12" forms the transmission bits $x_i$ for all values of "i" from 1 to "n" where $x_i$ is given as follows:

$$x_i = \overline{[P_i][x_{i-1}]}$$

where $P_i$ is the bit propagate given by $$P_i = a_i \oplus b_i$$

Where the carry-out $C_{OUT}$ is not to be considered as is the case in FIG. 5, the value of $x_{i-1}$ for "i" equal to 1 is 1, that is, $x_0$ is equal to 1 so that $x_1$ is given as follows:

$$x_i = \overline{[P_i][x_0]} = \overline{P_i}$$

Where the carry-out $C_{OUT}$ is to be considered, $x_i$ is also defined for "i" equal to 0 as follows:

$$x_0 = \overline{[P_0][x_{-1}]} = \overline{P_0}$$

In FIG. 5, the parity prediction network 12" forms the transmission bits $y_i$ for values of "i" equal to 3, 5, ..., 13, 15 where $y_i$ is given as follows:

$$y_i = [y_{i-2}] \oplus \overline{[(G_{i-1})(x_{i-2})]} \oplus \overline{[(G_i)(x_{i-1})]}$$

where $G_i$ is the bit generate given by, $$G_i = (a_i)(b_i)$$

Where the carry-out is not to be considered as in the case of FIG. 5, the value of $y_{i-2}$ for "i" equal to 3 is $G_i$ so that $y_3$ is given as follows:

$$y_3 = [y_1] \oplus \overline{[(G_2)(x_1)]} \oplus \overline{[(G_3)(x_2)]}$$

where, $$y_1 = \overline{G_1}$$

$$x_i = \overline{P_i}$$

Where the carry-out $C_{OUT}$ is to be considered, $y_i$ is also defined for "i" equal to 1 as follows:

$$y_1 = [y_{-1}] \oplus \overline{[(G_0)(x_{-1})]} \oplus \overline{(G_1)(x_0)}$$

where $x_{-1}$ is equal to the constant 1 and $x_0$ is equal to $\overline{P_0}$. In the latter case where the carry-out $C_{OUT}$ is to be considered, FIG. 5 is modified to include a NAND gate $21_0$ (not shown) to form a signal $\overline{[(x_{-1})(G_0)]}$ as an input to replace the 1 input to gate $30_{0,1}$. Also, a NAND gate $20_0$ (not shown) is included to form a signal $\overline{[(x_{-1})(P_0)]}$ as the $x_0$ input to gate $20_1$.

In FIG. 5, the use of only the odd-valued transmission signals $y_1, y_3, y_5, \ldots, y_{15}$ results from bundling the outputs from the gates 21. With this manner of bundling the outputs, the number of delay times created in forming the predicted parity $p_p$ bit is substantially reduced.

In FIG. 5, the numbers within the gate symbols designate the accumulated delay times where 2-input NAND gates are designated as one unit of delay and the EXCLUSIVE-NOR gates are designated as two units of delay. As indicated in FIG. 5, the output from the last EXCLUSIVE-NOR gate has 23 accumulated units of delay. If the parity prediction were extended to include the carry-out $C_{OUT}$, then 24 units of delay would be required.

While the invention has been particularly shown and described with reference to the preferred embodiments thereof, it will be understood by those skilled in the art that those changes in form and details may be made therein without departing from the spirit and the scope of the invention.

What is claimed is:

1. An adder for adding a first number and a second number to form a sum, said first number defined by first bits organized from high-order to low-order and having a first parity and said second number defined by second bits organized from high-order to low-order and having a second parity said adder including a parity prediction circuit comprising, a parity prediction network formed of a plurality of stages, said stages organized from high-order to low-order so that each one of said stages corresponds in order to one of said first bits and to one of said second bits, where each stage includes means for generating one or more parity prediction transmission bits from a corresponding one of said first bits, from a corresponding one of said second bits and from the next higher-order one or more of said transmission bits, said stages serially connected with each one or more transmission bits generated by a high-order stage connected as an input to the next low-order stage whereby the lowest-order one of said stages generates a low-order one of said transmission bits, and means for logically combining said low-order one of said transmission bits, and first parity and said second parity to form a predicted parity for said sum.

2. A binary adder for adding a first binary number $a_0, a_1, \ldots, a_i, \ldots, a_n$ having a parity bit $p_a$ and a second binary number $b_0, b_1, \ldots, b_i, \ldots, b_n$ having a parity bit $p_b$ together with a carry-in $C_{IN}$ to form the sum $s_0, s_1, \ldots, s_i, \ldots, s_n$, said adder including a parity prediction circuit comprising, a parity prediction network formed of "n" stages where each stage includes means for generating the parity prediction transmission bits $x_i$ and $y_i$ for values of "i" from 1 to "n" given as follows:

$$x_i = \overline{[P_i][x_{i-1}]}$$

$$y_i = [y_{i-1}] \oplus \overline{[(G_i)(x_{i-1})]}$$

where $P_i$ is the bit propagate and $G_i$ is the bit generate given by, $$P_i = a_i \oplus b_i$$

$$G_i = (a_i)(b_i)$$

said parity prediction circuit including means for logically combining the $x_n$ and $y_n$ transmission bits with the carry-in $C_{IN}$ and the parity bits $p_a$ and $p_b$ to form the predicted parity $p_p$ of said sum.

3. The adder of claim 2 wherein said first binary number is 0 whereby said binary adder is reduced to a binary counter having said parity prediction network formed of "n" stages.

4. The binary adder of claim 3 wherein each of said "n" stages is a 2-input NAND gate.

5. The binary adder of claim 2 where the parity prediction bits $x_0$ and $y_0$ are equal to a constant 1 and said predicted parity $p_p$ is for said sum.

6. The binary adder of claim 2 where said sum is formed with a carry-out $C_{OUT}$ and where said parity prediction network includes a stage for generating the transmission bits $x_i$ and $y_i$ for "i" equal to 0 as follows:

$$x_0 = \overline{[P_0][x_{-1}]} = \overline{[P_0]}$$

$$y_0 = [y_{-1}] \oplus \overline{[(G_0)(x_{-1})]} = \overline{[G_0]}$$

where $x_{-1}$ and $y_{-1}$ both equal a constant 1 whereby said predicted parity is for said sum together with said carry-out $C_{OUT}$.

7. The binary adder of claim 2 including means for generating a generated parity $p_s$ from said sum and means for comparing said generated parity $p_s$ and said predicted parity $p_p$ to detected errors in the operation of said adder.

8. A binary adder for adding a first binary number $a_0, a_1, \ldots, a_i, \ldots, a_n$ having a parity $p_a$ and a second binary number $b_0, b_1, \ldots, b_i, \ldots, b_n$ having a parity $p_b$ together with a carry-in $C_{IN}$ to form the sum $s_0, s_1, \ldots, s_i, \ldots, s_n$, and wherein "n" is an odd integer, said adder having a parity prediction circuit comprising, a parity prediction network including "n" first stages, one for each value of "i" from 1 to "n", for generating respectively the parity prediction transmission bit $x_i$, for all values of "i" from 1 to "n", and where $x_i$ is given as follows:

$$x_i = \overline{[P_i][x_{i-1}]}$$

where $P_i$ is the bit propagate given by, $$P_i = a_i \oplus b_i$$

said network including $[n-1]/2$ second stages, one for each value of "i" equal to 3, 5, 7, ..., $n-2$, n, for generating respectively the parity prediction transmission bit $y_i$ for values of "i" equal to 3, 5, 7, ..., $n-2$, n, and where $y_i$ is given as follows:

$$y_i = [y_{i-2}] \oplus \overline{[(G_{i-1})(x_{i-2})]} \oplus \overline{[(G_i)(x_{i-1})]}$$

where $G_i$ is the bit generate given by, $$G_i = (a_i)(b_i)$$

and where $$G_{i-1} = (a_{i-1})(b_{i-1})$$

and where
$x_{i-1}$, for the values of "i" equal to 3,5, 7, ..., $n-2$, n in said second stages is equal, respectively, to $x_2, x_4, x_6, \ldots, x_{n-3}, x_{n-1}$, as generated by said first stages, and where
$x_{i-2}$, for values of "i" equal to 3,5, 7, ..., $n-2$, n in said second stages is equal, respectively to $x_1, x_3, x_5, \ldots, x_{n-4}, x_{n-2}$, as generated by said first stages, said prediction circuit including means for logically combining the $x_n$ and $y_n$ transmission bits with the carry-in $C_{IN}$ and the parity bits $p_a$ and $p_b$ to form the predicted parity $p_p$.

9. The adder of claim 8 including means for each stage for generating the parity prediction transmission bit $y_i$ for all values of "i" from 1 to "n" given as follows:

$$y_i = [y_{i-1}] \oplus \overline{[(G_i)(x_{i-1})]}$$
$$= [y_{i-2}] \oplus \overline{[(G_{i-1})(x_{i-2})]} \oplus \overline{[(G_i)(x_{i-1})]}$$

10. The adder of claim 8 wherein, for "i" equal to 1, $x_i$ is $x_1$ given as follows:

$$x_1 = \overline{[P_1][x_0]} \overline{P_1}$$

where $x_0$ equals a constant 1, and for "i" equal to 3, $y_i$ is $y_3$ given as follows:

$$y_3 = [y_1] \oplus \overline{[(G_2)(x_1)]} \oplus \overline{[(G_3)(x_2)]}$$

where, $$y_1 = \overline{G_1}$$

$$x_1 = \overline{P_1}$$

and whereby said parity prediction $p_p$ is for said sum.

11. The adder of claim 8 wherein said first binary number is 0 whereby said binary adder is reduced to a binary counter having said parity prediction network formed of "n" stages.

12. The adder of claim 11 wherein each of said "n" stages is a 2-input NAND gate.

13. The adder of claim 8 including means for generating a generated parity $p_s$ from said sum and means for comparing said predicted parity $p_p$ and said generated parity $p_s$ to detect errors in the operation of said adder.

14. A counter for stepping a binary number defined by first bits organized from high-order to low-order and having a parity, to form a new binary number, said counter including a parity prediction circuit comprising, a parity prediction network including a plurality of stages, said stages organized from high-order to low-order so that each one of said stages corresponds in order to one of said first bits, where each stage includes means for generating a parity transmission bit from the next higher-order transmission bit and a corresponding one of said first bits, said stages connected in series from high-order to low-order to form a low-order transmission bit, and including means for logically combining said low-order transmission bit and said parity to form the predicted parity of said new binary number.

15. A counter including "n+1" stages designated from high-order to low-order as 0, 1, ..., i, ..., n and for stepping a binary number $b_0, b_1, \ldots, b_i, \ldots, b_n$ having a parity $p_b$ to form a new binary number $b'_0, b'_1, \ldots, b'_i, \ldots, b'_n$, said counter including a parity prediction circuit comprising, a parity prediction network including "n" stages designated from high-order to low-order as 1, 2, ..., i, ..., n where each stage includes means for generating the parity prediction transmission bit $x_i$, for all values of "i" from 1 to "n", given as follows:

$$x_i = \overline{[P_i][x_{i-1}]} = \overline{[b_i][x_{i-1}]}$$

where $P_i$ is the bit propagate given by, $$P_i = 0 \oplus b_i = b_i$$

said prediction circuit including logic means for logically combining the $x_n$ transmission bit and the parity $p_b$ to form the predicted parity $p_p$.

16. The counter of claim 15 wherein for "i" equal to 1, $x_i$ is given as follows:

$$x_1 = \overline{[b_1][x_0]} = \overline{b_0}$$

where $x_0$ is a constant 1 and said predicted parity is for said new binary number.

17. The counter of claim 15 including means for providing a carry-out $C_{OUT}$ from the $0^{th}$ high-order stage and wherein said network includes an additional "n+1" stage where said "n+1" stage is the highest-order stage and includes means for generating said parity prediction transmission bit $x_i$ for "i" equal to 0, where $x_0$ is given as follows:

$$x_0 = \overline{[b_0][x_{-1}]} = \overline{b_0}$$

and where $x_{-1}$ is a constant 1 and said predicted parity is for the combination of said new binary number and said carry-out $C_{OUT}$.

18. The counter of claim 15 wherein each stage consists of a 2-input NAND gate.

19. The counter of claim 15 including means for receiving a stepping signal $C_{IN}$ for stepping said counter and wherein said logic means includes means for logically combining the $x_n$ transmission bit, the stepping signal $C_{IN}$, and the parity $p_b$ to form said predicted parity.

20. In an adder having a plurality of stages organized from high-order to low-order for adding a first number, defined by first bits organized from high-order to low-order and having a first parity, and a second number, defined by second bits organized from high-order to low-order and having a second parity, to form a sum, a method of predicting parity for said sum comprising, generating for each of said stages one or more parity prediction transmission bits, said generating for each one of said stages employing corresponding ones of said first and said second bits from a corresponding stage and employing said transmission bits from a next higher-order stage, whereby said transmission bits are serially transmitted from high-order to low-order stages whereby lowest-order ones of said transmission bits are generated corresponding to the lowest-order one of said stages, logically combining said lowest-order ones of said transmission bits, said first parity and said second parity to form said predicted parity.

* * * * *

UNITED STATES PATENT AND TRADEMARK OFFICE
CERTIFICATE OF CORRECTION

PATENT NO. : 4,224,680
DATED : September 23, 1980
INVENTOR(S) : Kenichi Miura

It is certified that error appears in the above-identified patent and that said Letters Patent are hereby corrected as shown below:

IN THE CLAIMS:

Claim 1, column 8, line 5, between "bits," and "first" delete "and" and substitute therefor --said--.

Signed and Sealed this

Twenty-seventh Day of January 1981

[SEAL]

Attest:

RENE D. TEGTMEYER

Attesting Officer — Acting Commissioner of Patents and Trademarks